United States Patent
Kim

(10) Patent No.: US 9,850,341 B2
(45) Date of Patent: Dec. 26, 2017

(54) METHOD FOR PREPARING POLYMER MICROPARTICLES BY SPRAY PROCESS

(71) Applicant: VAIM CO., LTD., Okcheon-gun, Chungcheongbuk-do (KR)

(72) Inventor: Gun Poong Kim, Nonsan-si (KR)

(73) Assignee: VAIM CO., LTD., Chungcheongbuk-Do (KR)

( * ) Notice: Subject to any disclaimer, the term of this patent is extended or adjusted under 35 U.S.C. 154(b) by 0 days.

(21) Appl. No.: 14/769,494

(22) PCT Filed: Feb. 17, 2014

(86) PCT No.: PCT/KR2014/001254
§ 371 (c)(1),
(2) Date: Aug. 21, 2015

(87) PCT Pub. No.: WO2014/129773
PCT Pub. Date: Aug. 28, 2014

(65) Prior Publication Data
US 2016/0002393 A1  Jan. 7, 2016

(30) Foreign Application Priority Data
Feb. 22, 2013 (KR) ........................ 10-2013-0019086

(51) Int. Cl.
C08G 63/08 (2006.01)
C08L 101/16 (2006.01)
C08J 3/12 (2006.01)

(52) U.S. Cl.
CPC .............. *C08G 63/08* (2013.01); *C08J 3/122* (2013.01); *C08L 101/16* (2013.01); *C08J 2300/16* (2013.01); *C08J 2367/04* (2013.01)

(58) Field of Classification Search
None
See application file for complete search history.

(56) References Cited

U.S. PATENT DOCUMENTS 4,140,741 A * 2/1979 Lafferty ................. C08G 63/06
264/184
5,100,669 A   3/1992 Hyon et al.
(Continued)

FOREIGN PATENT DOCUMENTS

| CN | 1720902 | 1/2006 |
|---|---|---|
| CN | 102369234 A | 3/2012 |

(Continued)

OTHER PUBLICATIONS

International Search Report PCT/KR2014/001254 dated May 20, 2014.

*Primary Examiner* — Rachel Kahn
(74) *Attorney, Agent, or Firm* — Roberts Mlotkowski Safran Cole & Calderon, P.C.

(57) ABSTRACT

The present invention relates to a method for preparing polymer microparticles by a spray process, wherein a polymer solution obtained by dissolving a polyester-based polymer in ethylene carbonate (hereinafter, referred to as "EC"), which is a solvent, is sprayed at a low temperature hydrocarbon or alcohol solution, thereby preparing frozen EC/polymer microparticles, the frozen EC/polymer microparticles are dissolved in a salt aqueous solution, thereby dissolving and removing EC, and the residual EC in water is removed by washing.

4 Claims, 3 Drawing Sheets

(56) References Cited

U.S. PATENT DOCUMENTS 6,630,156 B1 10/2003 Seo et al.
2011/0245456 A1* 10/2011 Kim .................... B29B 9/12
528/361

FOREIGN PATENT DOCUMENTS

| JP | 2005-002302 | 6/2003 |
| KR | 1020010002589 | 1/2001 |
| KR | 1020100131244 | 12/2010 |
| KR | 1020120117585 | 10/2012 |

* cited by examiner

METHOD FOR PREPARING POLYMER MICROPARTICLES BY SPRAY PROCESS

TECHNICAL FIELD

The present invention relates to a method for preparing a polymer microparticles by a spray process, and in particular to a method for preparing polymer microparticles by a spray process wherein a polymer solution prepared by dissolving a polyester polymer in Ethylene Carbonate (EC) is sprayed onto low temperature hydrocarbon or alcohol solution so as to obtain frozen EC/polymer microparticles, thus preparing polymer microparticles after dissolving the EC in water and removing it.

BACKGROUND ART

A porous biodegradable polymer scaffold is widely being used as a mold for the sake of various tissue regenerations. Such a scaffold requires a porous structure having a good coupling between pores so as to promote nutrition and oxygen supply for the sake of enough cell adhesion density, cell growth and differentiation.

There are various methods for preparing a porous biodegradable polymer scaffold, of which a pore formation particle porogen leaching is being most widely used. For the sake of pore formation particles, various particles, for example, salt, foamed salt, carbohydrate, hydrocarbon, wax, etc. are used. In the above method, a pore formation particle in a polymer/solvent/pore formation particle mixture is selectively melted or foamed, thus forming pores. In addition to the above method, there are an emulsion/freeze dry, a phase isolation method, an expansion of a threshold liquid phase, a 3D inkjet printing, etc. (A. G. Mikos, G. Sarakinos, S. M. Leite, J. P. Vacanti, R. Langer, Biomaterials, 14 (1993) 323-330; Z. Ma, C. Gao, Y. Gong, J. Biomed. Mater. Res. 67B (2003) 610-617; A. Park, B. Wu, L. G. Griffith, J. Biomater. Sci. Polym. Ed. 9 (1998) 89-110).

The porous polymer scaffold may be usefully used for the sake of recovery of bone, cartilage and liver. This scaffold is implemented in a human body through a surgical operation, which may entail a physical and economical burden to a patient. In order to minimize any inconvenience to the patient, a method for injecting a biodegradable polymer scaffold in an injection way is being developed. In this method, a polymer solution including cells is injected and is photo cross-linked or a hydro gel is formed based on a sol-gel phenomenon. (J. j. Marler, A. Guha, J. Rowley, R. Koka, D. Monney, J. Upton, J. p. Vacanti, Plast. Reconstr. Surg. 105 (2000) 2049-2058; S. He, M. J. Yaszemski, A. W. Yasko, P. S. Engel, A. G. Mikos, Biomaterials, 21 (2000) 2389-2394).

The hydro gel fails to provide an optimum environment to the cell which needs adhesion to a solid surface. Since a mechanical strength is weak, it is hard to protect cells embedded inside. In an effort to resolve the above mentioned problems, a wide range of natural and synthetic microparticles including cultispher which are microparticles made of gelatin having a porous structure is used for culture of animal cells, but its biological synthesis is bad, and a mechanical strength is not good enough.

The currently used method for preparing injection type microparticles is an emulsification-solvent evaporation method wherein a W/O/W double emulsification method is implemented through two emulsification stages. A porous structure is determined based on the safety of the W/O emulsion which is the first emulsification stage. Since emulsion is thermodynamically unstable, water phase and organic phase tend to isolate from each other through coalescence, fusion, creaming, etc., it is hard to prepare, which is a disadvantage. (M. Kanouni, H. L. Rosano, N. Naouli, Adv. Colloid Interface Sci. 99 (2002) 229-254; A. J. Webster, M. E. Cates, Langmuir, 14 (1998) 2068-2079).

In addition, there is a method for preparing a micro particle carrier wherein a W/O emulsion is formed in such a way to add an aqueous solution containing foamed salt to an organic phase wherein aliphatic polyester polymer is melted, and in a W/O/W double emulsification stage, a re-dispersion and emulsification are performed in an aqueous solution containing hydrophilic surface active agent (refer to Korean patent number 801194). The above micro particle carrier has a characteristic, for example, a degradability, a high porosity, and an interconnectivity between pores, etc., but a mechanical strength is weak, and mass production is hard.

In a recently developed method for preparing a biodegradable polymer micro particle, a biodegradable polymer is dissolved in a DMSO (Dimethyl Sulfoxide) and is sprayed onto a low temperature hydrocarbon solution, and a DMSO/polymer solution is frozen, and a DMSO is removed from a low temperature salt aqueous solution, thus preparing biodegradable polymer microparticles (refer to Korean patent number 1105292). The thusly prepared microparticles have high porosity and good mechanical strength and good cell affinity. However, it has a problem in that hydrocarbon should be used as a freezing solution during the spraying process which is the most important process among the manufacturing processes. Hydrocarbon has a low ignition point, which means a high danger of fire. So, such a method is not easy to use for the sake of mass production. To this end, developments on a new preparation process which is able to resolve the above mentioned problems is inevitable.

Therefore, it urgently needs to develop a less danger and environment friendly mass production process which is able to prepare polymer microparticles having good biological suitability, biodegradability, porosity, mechanical strength, and cell affinity.

DISCLOSURE OF INVENTION

Technical Problem

To this end, during a research for resolving the above mentioned problems found in a conventional micro particle manufacturing process, the inventor of the present invention has found out the facts that it is possible to prepare porous polymer microparticles having good biological suitability and biodegradability in such a way that a polymer/EC solution prepared by dissolving a biodegradable polyester polymer in ethylene carbonate (EC) allows to freeze a polymer/EC solution in a low temperature hydrocarbon solution as well as in an alcohol solution because of the high melting point (MP: 37° C.), of the EC, and the inventor of the present invention has completed.

Solution to Problem

To achieve the above object, there is provided a method for preparing biodegradable polymer microparticles, which may include, but is not limited to, spraying a polymer/EC solution obtained by dissolving a biodegradable polyester polymer in ethylene carbonate (EC) onto a hydrocarbon solution of 5 or 10 carbons ($C_5$ to $C_{10}$) at −20° C. to 0° C. or an alcohol solution selected between methanol or ethanol, thus obtaining frozen polymer/EC microparticles; dissolving and eliminating the EC by inputting the polymer/EC microparticles; and washing the remaining EC with water so as to eliminate the remaining EC, thus preparing biodegradable polymer microparticles.

The present invention will be described below.

First, the ethylene carbonate (EC) solution of the biodegradable polyester polymer will be described.

The ethylene carbonate (EC) solution of the biodegradable polyester according to the present invention, which is an aliphatic polyester polymer, may be, but is not limited to, Polylactic acid (PLA), Polyglycolic acid (PGA), Poly(D,L-lactic-co-glycolic acid) (PLGA), Polycaprolactone (PCL), poly(valerolactone), poly(hydroxybutyrate), poly(hydroxy valerate) or derivative thereof or may be a mixture in a single component thereof or two or more than two components thereof. Preferably, it is PLA, PGA, PLGA, PCL or a mixture thereof, and more preferably is PLA, PLGA or PCL. They are polymers and preferably have average molecular weight of 10,000 to 250,000. Since the method for preparing biodegradable polymer microparticles according to the present invention have features in the way that it can allow to easily prepare spherical microparticles and easily control the sizes of microparticles, so the controls of the sizes of the microparticles are not limited by the average molecular weight.

In the present invention, the biodegradable polyester polymer solution can be used for various purposes in such a way to melt a corresponding polymer in the EC (Ethylene Carbonate) while controlling the concentration within a range of 1%~25% (w/v). The porosity of the degradable porous microparticles prepared while adjusting the concentration in the above manner can be adjusted. If the concentration of the polymer solution is less than 1%, the mechanical strength of the microparticles is weak, which means that applicability is bad, and if over 25%, the viscosity is too high, so fibers may be formed, thus lowering efficiency.

As an organic solvent used to dissolve the aliphatic polyester polymer, an EC (Ethylene Carbonate) which has a high freezing point (melting point 37° C.) and is well soluble in water is used.

The hydrocarbon of the present invention is a hydrocarbon which is not frozen at 0° C. below zero temperatures in Celsius and may be phase-isolated with respect to the EC and has 5 to 10 carbons in number ($C_5$ to $C_{10}$). It is a saturated hydrocarbon, for example, pentane, hexane, heptane, octane, nonane, decane and petrolum ether or a mixture thereof. It is preferable to use n-hexane which has a high volatile. Thanks to the high volatile of the n-hexane, it can be finally eliminated during the drying process. In case of hydrocarbon with less than carbons in number, volatile is too high, so it is hard to manufacture. In case of hydrocarbon with more than 10 carbons in number, applicability is bad. It is preferred that the temperature of the solution of hydrocarbon is lower than the melting point of the EC given the freezing of the EC. For the reliable freezing of the EC and the formation of microparticles, for preferably it is −20° C.~0° C., and most preferably, it is −10° C.~5° C.

In the present invention, the solution of alcohol is alcohol of 1 to 2 carbons ($C_1$ to $C_2$), for example, it is alcohol such as methanol and ethanol or an aqueous solution thereof. It is preferable to use ethanol which is environment friendly and does not have any toxicity and an aqueous solution thereof. If a polymer/EC solution is sprayed onto a low temperature alcohol solution, part of the EC slowly melts into an alcohol solution, so frozen polymer/EC microparticles are formed. The alcohol with more than 3 carbons may dissolve polymer, so it cannot be used.

It is preferred that the temperature of the alcohol solution has a temperature lower than the melting point of the EC for the sake of freezing of the EC. More preferably, for the sake of reliable freezing of the EC and the reliable formation of microparticles, it is −20° C.~0° C., and most preferably, it is −10° C.~5° C.

The frozen polymer/EC microparticles prepared in lower temperature hydrocarbons are added to the salt aqueous solution, thus dissolving and eliminating the EC, and it is washed with water, thus preparing polyester polymer microparticles of the present invention.

The frozen polymer/EC microparticles prepared in a low temperature alcohol solution are washed with distilled water, thus preparing polyester polymer microparticles of the present invention.

In the present invention, it is preferred that the salt aqueous solution should be kept unfrozen at below 0° C. in Celsius. Since it is preferred that the EC is possibly eliminated with a solution of below 0° C. in Celsius for the sake of stability of microparticles during its preparation. To this end, it is preferable to use NaCl or $CaCl_2$ aqueous solution at 5%~30% concentration. Preferably, the salt aqueous solution may be NaCl solution at 20%~25% concentration. The temperature is preferably −20° C.~0° C. When the salt is removed after the EC is eliminated with salt aqueous solution, it is washed using a lot of water, preferably, using deionized distilled water (D.D.W), thus eliminating the remaining EC and salt.

Advantageous Effects

The present invention allows to prepare biodegradable polymer microparticles in the above method. As for the biodegradable polymer microparticles of the present invention, the yield was above 80%, and the diameter was 30 μm to 1,000 μm. The diameters of the biodegradable polymer microparticles of the present invention can be adjusted depending on the spraying amount of the EC polymer solution and the amount of the spraying air during the spraying process, and the porosities of the biodegradable polymer microparticles can be adjusted depending on the concentration of polymer of the EC polymer solution.

The present invention is directed to a method for preparing biodegradable polymer microparticles by mass production method, which allows to provide good biological suitability, biodegradability, porosity, etc., so the biodegradable polymer microparticles of the present invention may be used as cell carriers and cell embryoid. Since biodegradable polymer microparticles of the present invention can be injected using a syringe, they can be injected into a human body by using them as a cell carrier for the sake of recovery of tissue so as to recover damaged cells.

BEST MODES FOR CARRYING OUT THE INVENTION

Figure 1:
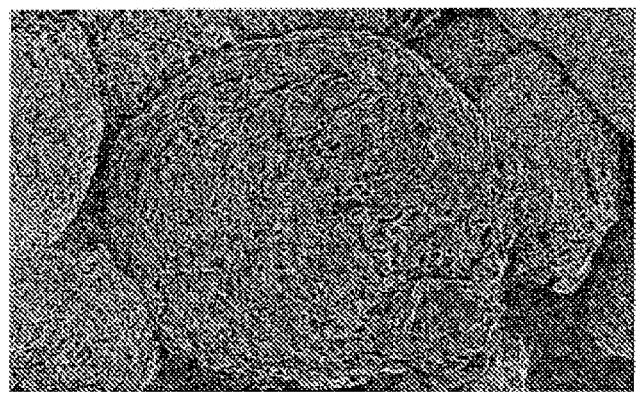
FIG. 1 is a photo of microparticles taken by an electron microscope and prepared by a method of the present invention (X 700; polymer solution concentration: 5%; spraying amount: 1 ml/min; air spraying speed: 5 L/min; freezing solvent: n-Hexane; freezing tank temperature: −10° C.).

The exemplary embodiment 1 among the exemplary embodiments below is the best mode for the present invention.

MODES FOR CARRYING OUT THE INVENTION

The exemplary embodiments of the present invention will be described below.

It should be understood that the embodiments below are provided for only illustrative purposes, and the contents of the present invention are not limited to the exemplary embodiments below.

Exemplary Embodiments 1-6

Exemplary Embodiment 1

5% (W/V) polymer solution was prepared by melting 2.5 g of polylactic acid (PLA) the average molecular weight of which is 110,000 in 50 ml of EC (Ethylene carbonate). The polymer solution was sprayed onto n-hexane cooled to −10° C. with a spraying amount of 1 ml/min and 5 L/min of the amount of spraying air. At this time, the sprayed polymer solution was frozen into spherical shapes on the low temperature n-hexane.

The frozen microparticles were collected and were placed for 48 hours in 100 ml of 25% (w/v) NaCl aqueous solution which was cooled to −10° C., and the EC component was dissolved and was filtered, thus obtaining polymer microparticles from which the EC had been filtered and eliminated. The obtained mixture was washed with 500 ml of distilled water, and the remaining EC was eliminated, and the mixture was frozen and dried, thus finishing the preparation of biodegradable polymer microparticles according to the present invention.

Exemplary Embodiment 2

The method of the exemplary embodiment 1 was performed except that the polymer solution which had been dissolved in the EC was dropped onto the n-hexane at −5° C., thus preparing biodegradable polymer microparticles.

Exemplary Embodiment 3

5% (W/V) polymer solution was prepared by melting 2.5 g of polylactic acid (PLA) the average molecular weight of which is 110,000 in 50 ml of EC (Ethylene carbonate). The polymer solution was sprayed onto ethanol cooled to −10° C. with a spraying amount of 1 ml/min and 5 L/min of the amount of spraying air. At this time, the sprayed polymer solution was frozen into circular ꙮ shapes on the low temperature ethanol.

The frozen microparticles were collected and washed with 500 ml of distilled water, and the remaining EC was eliminated and frozen and dried, thus finishing the preparation of biodegradable polymer microparticles of the present invention.

Exemplary Embodiment 4

The method of the exemplary embodiment 3 was performed except that the polymer solution which had been dissolved in the EC was dropped onto the ethanol at −5° C., thus preparing biodegradable polymer microparticles.

Exemplary Embodiment 5

In addition, the method of the exemplary embodiment 3 was performed except that the polymer solution which had been dissolved in the EC was dropped onto 75% ethanol aqueous solution at −10° C., thus preparing biodegradable polymer microparticles.

Exemplary embodiment 6. In addition, the method of the exemplary embodiment 3 was performed except that the polymer solution which had been dissolved in the EC was dropped onto 75% ethanol aqueous solution at 5° C., thus preparing biodegradable polymer microparticles.

Experimental Examples

In order to confirm the characteristics of each biodegradable polymer micro particle prepared by the exemplary embodiments 1 to 6 of the present invention, the types and manufacturing yields of the microparticles were measured with respect to the thusly prepared biodegradable polymer microparticles. At this time, the types of the microparticles were measures using the photos thereof taken by the electron microscope. The manufacturing yields were calculated by measuring the amount of microparticles which were finally collected, as compared to the amount of the inputted polymers.

Figure 2:
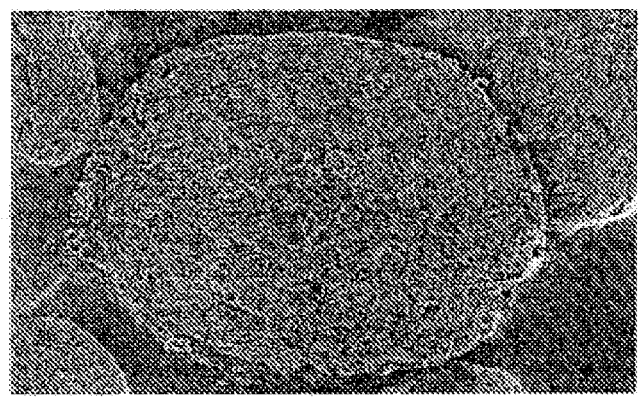
FIG. 2 is a photo of microparticles taken by an electron microscope and prepared by a method of the present invention (X 1,000; polymer solution concentration: 5%; spraying amount: 1 ml/min; air spraying speed: 5 L/min; freezing solvent: n-Hexane; freezing tank temperature: 0° C.)
Figure 3:
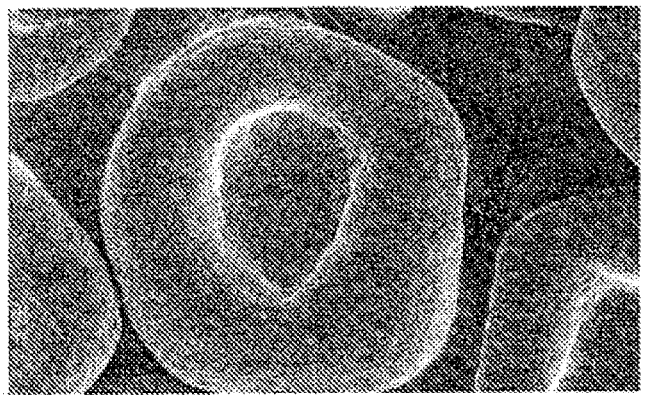
FIG. 3 is a photo of microparticles taken by an electron microscope and prepared by a method of the present invention (X 1,500; polymer solution concentration: 5%; spraying amount: 1 ml/min; air spraying speed: 5 L/min; freezing solvent: EtOH; freezing tank temperature: −10° C.).
Figure 4:
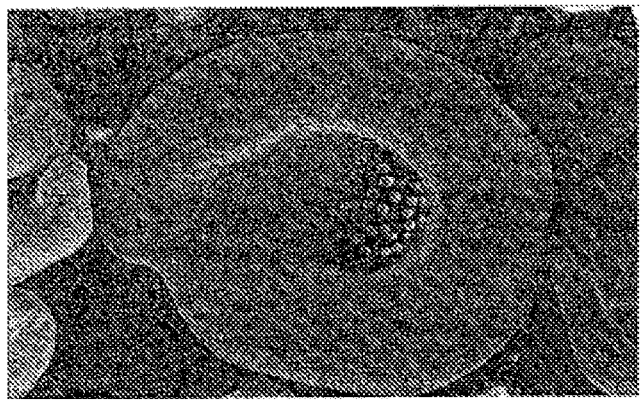
FIG. 4 is a photo of microparticles taken by an electron microscope and prepared by a method of the present invention (X 500; polymer solution concentration: 5%; spraying amount: 1 ml/min; air spraying speed: 5 L/min; freezing solvent: EtOH; freezing tank temperature: −5° C.).
Figure 5:
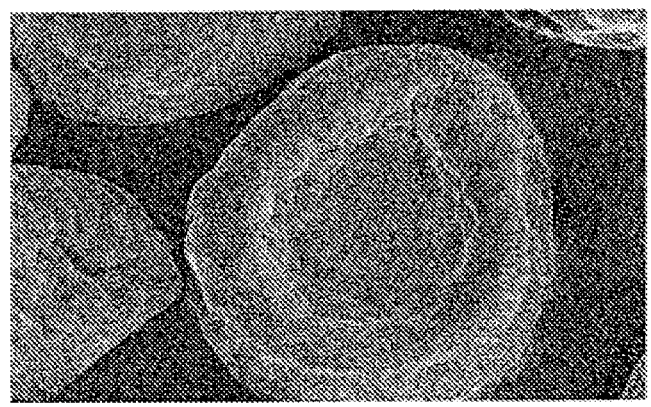
FIG. 5 is a photo of microparticles taken by an electron microscope and prepared by a method of the present invention (X 700; polymer solution concentration: 5%; spraying amount: 1 ml/min; air spraying speed: 5 L/min; freezing solvent: 75% EtOH aqueous solution; freezing tank temperature: −5° C.).
Figure 6:
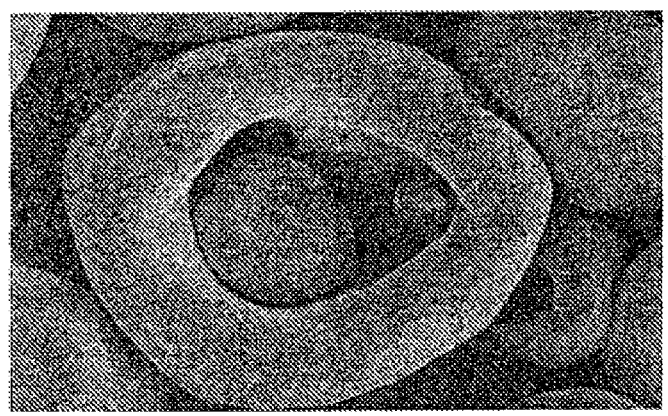
FIG. 6 is a photo of microparticles taken by an electron microscope and prepared by a method of the present invention (X 800; polymer solution concentration: 5%; spraying amount: 1 ml/min; air spraying speed: 5 L/min; freezing solvent: 75% EtOH aqueous solution; freezing tank temperature: 5° C.).

As a result, as seen in FIGS. 1 to 6 and the table 1 below, the frozen solvent of the EC polymer solution was produced into spherical microparticles in the n-hexane, and the frozen solvent was produced into circular ꙮ shapes in the aqueous solution thereof. As for the types of the microparticles prepared by the preparing method of the present invention, the microparticles are sized to be well administrated into a human body. In case of the microparticles prepared in the ethanol and aqueous solution thereof, the microparticles were formed in circular ꙮ shapes to which the cell can well adhere, so the microparticles of the present invention can be usefully used as cell carriers.

TABLE 1

| Preparation condition; 5% PLA/EC solution, spraying speed; 1 ml/min, air spraying amount; 5 L/min | | | | |
|---|---|---|---|---|
| Freezing solvent | Freezing temperature ° C. | Types of microparticles | Size of micro particle μm | Yields % |
| n-Hexane | −10 | Porous | 100~300 μm | 81 |
|  | 0 |  |  | 80 |
| EtOH | −10 | Circular | | 83 |
|  | −5 | 凹 shape | | 82 |
| 75% EtOH | −5 | | | 82 |
|  | 5 | | | 81 |

INDUSTRIAL APPLICABILITY

The present invention is a useful invention which can provide a method for preparing polymer microparticles which allows to inject using a syringe a spherical shaped or circular 凹 shaped biodegradable polymer micro particle carrier. In particular, the circular 凹 shaped microparticles may enhance an adhering force of cell, so it can be used as a cell carrier, which may allow to develop a biological industry.

The invention claimed is:

1. A method for preparing biodegradable polymer microparticles, comprising:

dissolving a biodegradable polyester polymer in ethylene carbonate (EC) to obtain a polymer/EC solution;

spraying the polymer/EC solution onto an alcohol selected from the group consisting of methanol or ethanol or an aqueous solution thereof where the alcohol has a temperature between −20° C. and 0° C., thus obtaining frozen polymer/EC microparticles;

dissolving and removing EC from the polymer/EC microparticles by adding the polymer/EC microparticles into a salt aqueous solution; and filtering and washing the microparticles with water so as to eliminate the remaining EC, thus obtaining biodegradable polymer microparticles.

2. The method of claim 1, wherein the biodegradable polyester polymer is a polymer selected among Polylactic acid (PLA), Polyglycolic acid (PGA), Poly(D,L-lactic-co-glycolic acid) (PLGA), Polycaprolactone (PCL), poly(valerolactone), poly(hydroxybutyrate) and poly(hydroxy valerate) and has a weight average molecular weight of 10,000 to 250,000.

3. The method of claim 1, wherein the concentration of biodegradable polyester polymer dissolved in the ethylene carbonate (EC) is 1 to 25% (w/v).

4. The method of claim 1, wherein the concentration of salt in the salt aqueous solution is 5 to 30% (w/v) and wherein the salt is NaCl or $CaCl_2$.

* * * * *